May 28, 1946.  R. E. MARBURY  2,401,009
SERIES CAPACITOR PROTECTION
Filed Jan. 14, 1944

WITNESSES:
E. A. McCloskey.
F. P. Lyle

INVENTOR
Ralph E. Marbury.
BY O. B. Buchanan
ATTORNEY

Patented May 28, 1946

2,401,009

UNITED STATES PATENT OFFICE 2,401,009

SERIES CAPACITOR PROTECTION

Ralph E. Marbury, Wilkinsburg, Pa., assignor to Westinghouse Electric Corporation, East Pittsburgh, Pa., a corporation of Pennsylvania Application January 14, 1944, Serial No. 518,208

11 Claims. (Cl. 175—294)

The present invention relates to series capacitors for electrical transmission and distribution lines and, more particularly, to protective means for protecting series capacitors against overvoltages.

Series capacitors are used in transmission and distribution lines to cancel part or all of the inductive reactance of the line, in order to improve the stability and increase the power limits of long, high-voltage synchronous transmission systems, or to improve the voltage regulation of distribution lines. Since the series capacitor carries the line current, the voltage across it is proportional to the line current, and in case of a fault on the line, the voltage appearing across the series capacitor may be several times the normal voltage corresponding to the normal full load current. The cost of a capacitor varies approximately with the square of the voltage for which it is insulated, and for this reason it is economically impractical to use series capacitors which are capable of withstanding the maximum voltage to which they might be subjected under fault conditions, and the voltage rating of series capacitors is usually determined by the voltage corresponding to the normal full load current. It is necessary, therefore, to provide protective devices to protect series capacitors against the very high voltages to which they may be subjected in case of a fault on the line.

One type of protective device for series capacitors which has been found to be very successful is the arrangement described and claimed in my prior Patent No. 2,072,717, issued March 2, 1937, and assigned to the Westinghouse Electric & Manufacturing Company. In this type of protective system, the capacitor is protected by a main protective gap device arranged to bypass the capacitor and which is capable of carrying very heavy currents but does not have to be capable of accurate calibration. The main protective gap device is caused to break down when the voltage across the series capacitor reaches a predetermined value by means of an auxiliary trigger circuit which is responsive to a voltage proportional to the voltage across the series capacitor, and which includes an accurately calibrated auxiliary gap device for initiating operation of the trigger circuit. Such a system preferably also includes means for bypassing the main gap device to extinguish the arc, and for interrupting the bypass circuit to restore the series capacitor to service when the line current has fallen to a safe value.

The present invention relates to protective devices of this type, and has as its principal object the provision of such a system in which much closer protection for the series capacitor can be provided than was previously obtainable. That is, the voltage across the series capacitor is permitted to rise to a predetermined value which the capacitor can safely withstand for a reasonable time, such as 115% to 125% of the normal voltage, and the main protective gap device is caused to operate to protect the capacitor if the voltage exceeds this value by even a very small amount. Such close protection was not previously obtainable without the risk of occasional undesired operation at lower voltages, because of the difficulty of accurately calibrating the auxiliary gap to respond reliably to such small changes in voltage, and with prior protective devices of this type, the voltage across the series capacitor was necessarily permitted to rise to values of the order of 165% to 200% of the normal rated voltage before operation of the gap.

A further object of the invention is to provide a protective system for series capacitors of the type described above, utilizing a trigger circuit to initiate breakdown of a main protective gap device, in which the system is so designed that the voltage to which the trigger circuit responds rises much faster than the voltage across the series capacitor, when the series capacitor voltage has increased above a predetermined value, so that a large increase in the voltage to which the trigger circuit is responsive occurs in response to a relatively much smaller increase in the series capacitor voltage.

Another object of the invention is to provide a protective system for series capacitors in which a trigger circuit is used to initiate breakdown of a main protective gap device, and in which the trigger circuit may have a slight time lag in responding to an excess voltage on the series capacitor and is used to initiate breakdown of the main gap to obtain close protection against moderate overvoltages which the capacitor can safely withstand for short periods, in the manner described above, while the main gap itself is used to provide substantially instantaneous protection against higher overvoltages which cannot be permitted even momentarily.

A more specific object of the invention is to provide a protective system for series capacitors including a trigger circuit for effecting breakdown of a main protective gap device, in which the energizing means for the trigger circuit includes a saturable inductive device designed to saturate when the voltage across the series capacitor exceeds a predetermined value, and to approach a condition of resonance with the capacitance of the trigger circuit, or with an extra capacitor, so that above a certain voltage across the series capacitor, a non-linear relation is obtained between the series capacitor voltage and the voltage to which the trigger circuit is responsive.

Further objects and advantages of the invention will be apparent from the following detailed description, taken in connection with the accompanying drawing, in which.

Figure 1:
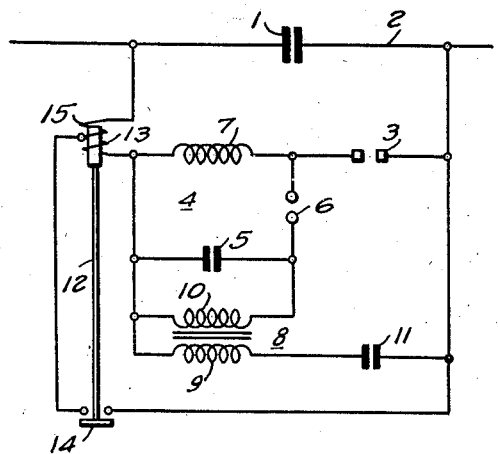
Figure 1 is a schematic wiring diagram showing one embodiment of the invention.

Fig. 1 shows a series capacitor equipment for an alternating-current transmission or distribution system, which consists of a series capacitor 1 connected in series with the alternating-current line 2, and the associated protective system for the capacitor 1. It is to be understood, of course, that the line 2 represents one conductor of either a single-phase or three-phase line, and that similar equipments will be provided in the other conductors of the line. The series capacitor 1 is protected by means of a main gap device 3 which is connected, as shown, in a bypassing circuit around the capacitor 1, so that when the gap device 3 is discharging, the capacitor 1 is substantially short-circuited. The gap device 3 is preferably a gap of the type disclosed and claimed in the Marbury et al. Patent No. 2,144,503, issued January 17, 1939. Such a gap device comprises massive carbon electrodes which are capable of carrying heavy currents for an appreciable length of time without material damage, so that the gap can safely carry the heaviest fault current that may flow in the line 2. This type of gap is also characterized by having a low recovery voltage so that the arc restrikes promptly after each current zero, and the capacitor is not subjected to high voltage peaks at the beginning of each half cycle.

A gap device of this type is not readily capable of accurate calibration, especially for relatively low breakdown voltages, and a trigger circuit, generally designated by 4, is utilized to initiate breakdown of the gap 3 in response to an excess voltage of predetermined magnitude appearing across the capacitor 1. The trigger circuit 4 may be substantially similar to the trigger circuit described in the two patents previously referred to, and includes a small auxiliary capacitor 5, an auxiliary spark gap device 6, and a high-frequency coil 7. The auxiliary spark gap device 6 preferably has metal electrodes and is designed so as to be capable of accurate calibration and to retain its calibration after repeated operation, which can readily be done because the gap 6 is not required to carry large currents and carries current only for very brief periods. The high-frequency coil 7 is preferably an air-core inductance designed to have negligible impedance at the normal line frequency, such as 60 cycles, but to have high enough impedance to produce a substantial voltage drop across it at very high frequencies.

The trigger circuit 4 is energized in response to the voltage appearing across the series capacitor 1 by means of a transformer 8. The transformer 8 has a saturable iron core on which are wound a primary winding 9 and a secondary winding 10. The primary winding 9 of the transformer 8 is connected to be energized by the voltage across the series capacitor 1, and the secondary winding 10 is connected to energize the auxiliary capacitor 5. A small tuning capacitor 11 is connected in series with the primary winding 9 of the transformer 8, and the primary winding 9 and capacitor 11 are tuned so as to be substantially non-resonant at line frequency under normal voltage conditions, although preferably they should be fairly close to resonance. As previously stated, the transformer 8 has a saturable iron core which is designed to saturate when the voltage applied to the primary winding 9 exceeds a predetermined value, which is preferably equal to the maximum sustained voltage which is to be permitted to exist across the series capacitor 1. The transformer 8 is so designed that when the core saturates, the reactance of the winding 9 becomes more nearly equal to the capacitive reactance of the tuning capacitor 11, so that the winding 9 and capacitor 11 approach more closely to a condition of resonance, resulting in a rapid rise of the voltage across the winding 9.

Since it is usually undesirable to permit the main gap device 3 to continue discharging for more than a few half-cycles, and since a gap of the type described is not self-clearing, but tends to maintain the discharge after it has once broken down, means are preferably provided for bypassing the gap device 3 in order to extinguish the discharge. For this purpose, a contactor 12 may be provided having an operating coil 13 which is responsive to current flowing in the circuit of the main gap device 3. The coil 13 may either be connected directly in the circuit, as shown in Fig. 1, or it may be connected to a current transformer for energization in response to the gap current. The contactor 12 has a contact 14 which is connected to complete a bypass circuit around both the series capacitor 1 and the main gap device 3, the bypass circuit preferably being completed through a portion of the coil 13, as indicated at 15, which functions as a holding coil.

The operation of this protective system should now be apparent. Under normal conditions, when the voltage across the series capacitor 1 does not exceed its normal rated voltage, the contactor 12 is open, and neither the main gap device 3 nor the auxiliary gap device 6 is near its respective breakdown voltage. The voltage across the primary winding 9 of the transformer 8 has a fixed relation to the voltage across the series capacitor 1, since the winding 9 and capacitor 11 are not in resonance under normal voltage conditions, and the secondary winding 10 of the transformer therefore applies a voltage to the auxiliary capacitor 5 which has a definite, fixed relation to the voltage across the series capacitor 1.

Figure 2:
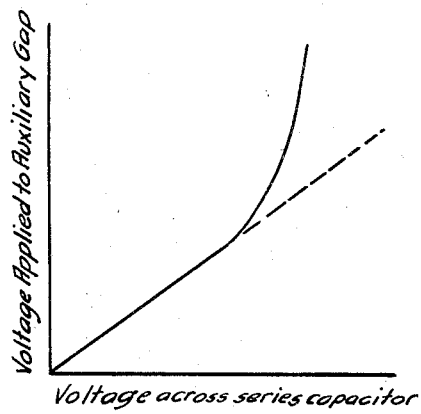
Fig. 2 is a diagram illustrating the relation of certain voltages in the circuit of Fig. 1.

In case of a fault on the line 2, causing an abnormally high current to flow through the series capacitor 1, the voltage across the series capacitor will increase proportionally, and the transformer 8 will apply a proportionally increased voltage to the auxiliary capacitor 5. This relation of the voltages obtains until the voltage applied to the primary winding 9 of the transformer 8 reaches a predetermined value, which may, for example, correspond to from 115% to 125% of the normal rated voltage of the series capacitor 1. When this voltage is exceeded, the transformer core starts to saturate, and the winding 9 and tuning capacitor 11 approach a condition of resonance, which results in a marked relative increase in the voltage across the winding 9. The voltage applied to the auxiliary capacitor 5 by the secondary winding 10 of the transformer 8 increases in the same manner, and since the auxiliary gap device 6 is responsive to the voltage across the capacitor 5, because of the substantially negligible 60-cycle impedance of the high-frequency coil 7, the voltage applied to the auxiliary gap 6 varies in the same manner with respect to the voltage across the series capacitor 1 as the voltage of the primary winding 9 does. Because of the condition of resonance, or near-resonance, between the winding 9 and capacitor 11, when the voltage of the series capacitor 1 exceeds the predetermined value, the voltage across the winding 9 and, therefore, the voltage applied to the auxiliary gap 6 has a non-linear relation to the series capacitor voltage, as shown by the curve of Fig. 2, so that when the predetermined voltage corresponding to the maximum permissible prolonged over-voltage on the series capacitor is exceeded, a very small increase in the series capacitor voltage results in a large increase in the voltage applied to the auxiliary gap 6.

The auxiliary gap 6 is calibrated to break down at a voltage corresponding approximately to the maximum sustained voltage which it is desired to permit across the capacitor 1, and, as described above, when this value is exceeded, the voltage applied to the gap 6 increases very rapidly, so that the gap 6 breaks down very reliably in response to even a slight increase in the series capacitor voltage. When the gap 6 breaks down, the auxiliary capacitor 5 and high-frequency coil 7 are connected in a local series circuit, and an oscillatory high-frequency current flows in this circuit, which may have a natural frequency of the order of 500,000 cycles to 1,000,000 cycles per second. The high-frequency voltage appearing across the coil 7 is impressed on the main gap device 3 and causes it to break down, short-circuiting the series capacitor 1 and protecting it from the overvoltage.

When the main gap device 3 breaks down and begins conducting current, the coil 13 of the contactor 12 is energized and closes the contact 14, completing a bypass circuit around both the series capacitor 1 and the main gap 3, so that the arc in the gap 3 is extinguished, and the short-circuit current of the line 2 is transferred to the bypass circuit through the contact 14. Thus, the gap 3 is relieved from carrying current for longer than the time required for the contactor 12 to close, which is of the order of a few cycles, so that the gap is protected from damage from the heavy current, and its electrodes have time to cool, so that there is no danger of the arc restriking on the normal line voltage when the bypass circuit is opened. The portion 15 of the coil 13 holds the contactor 12 closed until the line current has fallen to a safe value, which may be equal to the normal full load current or slightly higher, and when the current has decreased to this value, the contactor 12 opens its contact 14, interrupting the bypass circuit and restoring the capacitor 1 to service.

Figure 3:
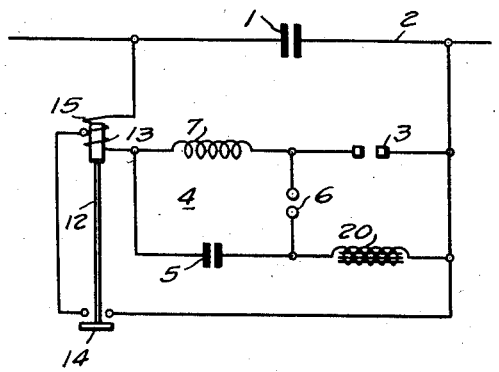
Figs. 3 and 4 are schematic wiring diagrams showing further embodiments of the invention.

Fig. 3 shows another embodiment of the invention, in which it is applied to a protective system using a circuit of the type disclosed and claimed in my copending application, Serial No. 445,751, filed June 4, 1942. In this embodiment of the invention, the capacitor 1 is protected by a main gap device 3 in the same manner as described in connection with Fig. 1, and breakdown of the main gap device 3 is initiated by a trigger circuit 4, which may be the same as the circuit described above. In this embodiment of the invention, however, the auxiliary capacitor 5 is connected in series with a saturable iron-core reactor 20 across the series capacitor 1. The auxiliary capacitor 5 and reactor 20 are designed so that under normal voltage conditions, they are non-resonant at the line frequency, although they preferably approach a condition of resonance sufficiently closely that the voltage across the auxiliary capacitor 5 is greater than the voltage across the series capacitor 1. Under these conditions, as described in the copending application referred to above, the voltage across the capacitor 5 has a fixed relation to the voltage of the series capacitor 1.

In accordance with the present invention, however, the core of the reactor 20 is designed to saturate at a value of voltage corresponding approximately to the maximum sustained voltage which is to be permitted across the capacitor 1, and when the core saturates, the reactor 20 and auxiliary capacitor 5 approach more closely to a condition of resonance, so that the voltage across the capacitor 5 has a non-linear relation to the voltage across the series capacitor 1, and a rapid increase in the voltage applied to the auxiliary gap 6 results from a small increase in voltage across the series capacitor 1, the effect being similar to the effect obtained in the circuit of Fig. 1 and shown in the curve of Fig. 2. This rapid increase in voltage causes reliable operation of the gap 6 when the series capacitor voltage exceeds the predetermined maximum value even slightly, and the operation of the trigger circuit 4 to initiate breakdown of the main gap device 3 is the same as previously described.

In this embodiment of the invention, the presence of the iron-core reactor 20 in series with the auxiliary capacitor 5 results in a slight time lag, so that the response of the system to change in voltage across the series capacitor 1 is not instantaneous. Thus, in a typical embodiment of the invention, there may be a time lag of the order of three-fourths of a cycle, which in the case of a high transient voltage, might allow the voltage across the series capacitor to reach dangerously high values in the first half-cycle, before the protective system would operate to bypass the series capacitor. In order to provide complete protection for the capacitor 1 against both high transient voltages and lower overvoltages of longer duration, the main gap device 3 may be adjusted to have a breakdown voltage equal to the maximum voltage which can be permitted to appear across the series capacitor 1 even momentarily, such as 300% of the normal rated voltage, for example. The main gap 3 will then break down and provide substantially instantaneous protection for the capacitor if the voltage exceeds this value. If desired, a second trigger circuit of conventional type, as described in the prior Marbury patents referred to above, might be used to initiate this instantaneous operation of the gap device 3 on high voltages in the manner described in the copending application referred to above. The trigger circuit 4 of the present invention would then be relied upon to provide close and reliable protection against lower overvoltages, such as 115% to 125% of the normal voltage, which could be permitted to appear across the series capacitor 1 for short periods of time, such as three-fourths of a cycle or even several cycles.

A contactor 12 has been shown in Fig. 3 for bypassing the main gap device 3, and for subsequently interrupting the bypass circuit in the same manner as described above in connection with Fig. 1. It is to be understood, however, that the contactor 12 is only illustrative of any suitable means for bypassing both the main gap device 3 and capacitor 1 in response to operation of the gap device 3, and for subsequently interrupting the bypass circuit to restore the capacitor to service. The embodiment of the invention shown in Fig. 3 is particularly suitable for use on synchronous transmission systems where the stability of the system is of primary importance, and where it is necessary to restore the series capacitor to service after a fault has been cleared within a period of a few cycles in order that it will be available to assist in maintaining stability, and for this purpose bypassing means such as those shown in the copending application of R. D. Evans et al., Serial No. 445,562, filed June 3, 1942, now Patent No. 2,345,590, issued April 4, 1944, may be used instead of the simple contactor 12.

Figure 4:
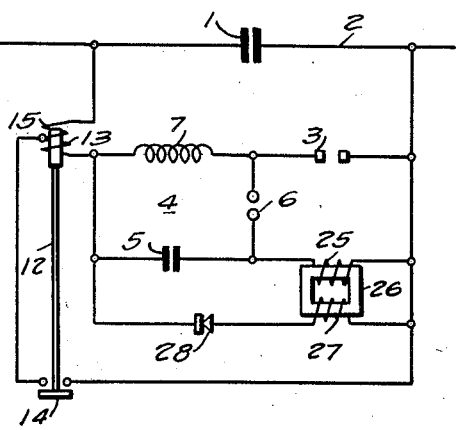

Fig. 4 shows another embodiment of the invention which is generally similar to that of Fig. 3. In this embodiment of the invention, a reactor 25 wound on an iron core 26 is connected in series with the auxiliary capacitor 5 in the same manner as the reactor 20 of Fig. 3, and a separate direct-current winding 27 is provided on the core 26 to saturate the core in response to excess voltage on the series capacitor 1. Any suitable means may be used for providing direct-current excitation of the winding 27 in response to the voltage across the capacitor 1. This may be done in a very simple manner, as shown on the drawing, by exciting the winding 27 by means of a rectifier 28 connected in series with the winding across the series capacitor 1. It will be apparent that the operation of this embodiment of the invention is similar to that of Fig. 3. Under normal voltage conditions, the core 26 of the reactor 25 is not saturated, and the voltage across the auxiliary capacitor 5 has a fixed linear relation to the voltage across the series capacitor 1. When the series capacitor voltage increases above the predetermined value, the direct-current excitation of the winding 27 increases sufficiently to saturate the core 26, which causes the reactor 25 and auxiliary capacitor 5 to closely approach a condition of resonance, resulting in a sharp increase of the voltage across the capacitor 5, so that the same non-linear relation between the series capacitor voltage and the voltage applied to the auxiliary gap 6 is obtained as in the previously described embodiments of the invention. As before, a contactor 12 is shown for bypassing the main gap 3 and series capacitor 1, and for interrupting the bypass circuit, but it is to be understood that any suitable means may be used for this purpose.

It should now be apparent that a protective system has been provided for series capacitors which, in any of its several embodiments, is effective to provide very close protection against overvoltages in that it will permit the voltage across the series capacitor to rise to a predetermined value without any danger of undesired operation of the system, since the auxiliary gap device 6 is not normally subjected to a voltage anywhere near its breakdown voltage, but any slight increase in the voltage across the series capacitor above the predetermined maximum permissible voltage results in a very rapid increase in the voltage applied to the auxiliary gap 6, so that positive and reliable operation of the system is obtained and very close protection of the series capacitor is made possible.

Although certain specific embodiments of the invention have been described for the purpose of illustration, the invention is not limited to these specific arrangements since it is capable of various other embodiments and modifications, and it is to be understood, therefore, that the invention is not limited to the specific arrangements shown and described, but in its broadest aspects it includes all equivalent modifications and embodiments which come within the scope of the appended claims.

I claim as my invention:

1. A series capacitor equipment for an alternating-current line, said equipment including a series capacitor, means for connecting said series capacitor in series in a conductor of said line, a main protective gap device, means for connecting said main gap device in a bypassing circuit around the series capacitor, a trigger circuit for initiating breakdown of the main gap device, said trigger circuit comprising an auxiliary capacitor, a trigger gap device connected to be responsive to the voltage of said auxiliary capacitor, a high-frequency coil connected to the auxiliary capacitor, through said trigger gap device, said high-frequency coil being also connected in a series circuit with the main gap device, and means for energizing the auxiliary capacitor from the voltage across the series capacitor in such a manner that the voltage applied to the auxiliary capacitor rises more rapidly than the voltage across the series capacitor when the series capacitor voltage exceeds a predetermined value.

2. A series capacitor equipment for an alternating-current line, said equipment including a series capacitor, means for connecting said series capacitor in series in a conductor of said line, a main protective gap device, means for connecting said main gap device in a bypassing circuit around the series capacitor, a trigger circuit for initiating breakdown of the main gap device, said trigger circuit comprising an auxiliary capacitor, a trigger gap device connected to be responsive to the voltage of said auxiliary capacitor, a high-frequency coil connected to the auxiliary capacitor through said trigger gap device, said high-frequency coil being also connected in a series circuit with the main gap device, and means for energizing the auxiliary capacitor from the voltage across the series capacitor, said energizing means including voltage-responsive variable reactance means for varying the relation between the voltage across the series capacitor and the voltage applied to the auxiliary capacitor.

3. A series capacitor equipment for an alternating-current line, said equipment including a series capacitor, means for connecting said series capacitor in series in a conductor of said line, a main protective gap device, means for connecting said main gap device in a bypassing circuit around the series capacitor, a trigger circuit for initiating breakdown of the main gap device, said trigger circuit comprising an auxiliary capacitor, a trigger gap device connected to be responsive to the voltage of said auxiliary capacitor, a high-frequency coil connected to the auxiliary capacitor through said trigger gap device, said high-frequency coil being also connected in a series circuit with the main gap device, and means for energizing the auxiliary capacitor from the voltage across the series capacitor, said energizing means including saturable reactive means for varying the relation between the voltage across the series capacitor and the voltage applied to the auxiliary capacitor when the series capacitor voltage exceeds a predetermined value.

4. A series capacitor equipment for an alternating-current line, said equipment including a series capacitor, means for connecting said series capacitor in series in a conductor of said line, a main protective gap device, means for connecting said main gap device in a bypassing circuit around the series capacitor, a trigger circuit for initiating breakdown of the main gap device, said trigger circuit comprising an auxiliary capacitor, a trigger gap device connected to be responsive to the voltage of said auxiliary capacitor, a high-frequency coil connected to the auxiliary capacitor through said trigger gap device, said high-frequency coil being also connected in a series circuit with the main gap device, and means for energizing the auxiliary capacitor from the voltage across the series capacitor, said energizing means including capacitance and saturable reactance means adapted to approach a condition of line-frequency resonance with said capacitance when the voltage across the series capacitor exceeds a predetermined value.

5. A series capacitor equipment for an alternating-current line, said equipment including a series capacitor, means for connecting said series capacitor in series in a conductor of said line, a main protective gap device, means for connecting said main gap device in a bypassing circuit around the series capacitor, a trigger circuit for initiating breakdown of the main gap device, said trigger circuit comprising an auxiliary capacitor, a trigger gap device connected to be responsive to the voltage of said auxiliary capacitor, a high-frequency coil connected to the auxiliary capacitor through said trigger gap device, said high-frequency coil being also connected in a series circuit with the main gap device, and an energizing circuit for the auxiliary capacitor, said energizing circuit including capacitance and a saturable inductance device connected to energize the auxiliary capacitor from the voltage across the series capacitor, said inductance device being adapted to saturate and approach a condition of line-frequency resonance with the capacitance of the energizing circuit when the series capacitor voltage exceeds a predetermined value.

6. A series capacitor equipment for an alternating-current line, said equipment including a series capacitor, means for connecting said series capacitor in series in a conductor of said line, a main protective gap device, means for connecting said main gap device in a bypassing circuit around the series capacitor, a trigger circuit for initiating breakdown of the main gap device, said trigger circuit comprising an auxiliary capacitor, a trigger gap device connected to be responsive to the voltage of said auxiliary capacitor, a high-frequency coil connected to the auxiliary capacitor through said trigger gap device, said high-frequency coil being also connected in a series circuit with the main gap device, a saturable iron-core transformer having a primary winding connected to be energized by the voltage across the series capacitor and a secondary winding connected to energize said auxiliary capacitor, and a tuning capacitor connected in series with the primary winding of said transformer, said transformer being adapted to saturate and approach a condition of line-frequency resonance with said tuning capacitor when the series capacitor voltage exceeds a predetermined value.

7. A series capacitor equipment for an alternating-current line, said equipment including a series capacitor, means for connecting said series capacitor in series in a conductor of said line, a main protective gap device, means for connecting said main gap device in a by-passing circuit around the series capacitor, a trigger circuit for initiating breakdown of the main gap device, said trigger circuit comprising an auxiliary capacitor, a trigger gap device connected to be responsive to the voltage of said auxiliary capacitor, a high-frequency coil connected to the auxiliary capacitor through said trigger gap device, said high-frequency coil being also connected in a series circuit with the main gap device, and means for energizing the auxiliary capacitor from the voltage across the series capacitor, said energizing means including a saturable reactor adapted to approach a condition of line-frequency resonance with the auxiliary capacitor when the series capacitor voltage exceeds a predetermined value.

8. A series capacitor equipment for an alternating-current line, said equipment including a series capacitor, means for connecting said series capacitor in series in a conductor of said line, a main protective gap device, means for connecting said main gap device in a bypassing circuit around the series capacitor, a trigger circuit for initiating breakdown of the main gap device, said trigger circuit comprising an auxiliary capacitor, a trigger gap device connected to be responsive to the voltage of said auxiliary capacitor, a high-frequency coil connected to the auxiliary capacitor through said trigger gap device, said high-frequency coil being also connected in a series circuit with the main gap device, and means for energizing the auxiliary capacitor from the voltage across the series capacitor, said energizing means including a saturable reactor connected in series with the auxiliary capacitor and adapted to saturate and approach a condition of line-frequency resonance with the auxiliary capacitor when the series capacitor voltage exceeds a predetermined value.

9. A series capacitor equipment for an alternating-current line, said equipment including a series capacitor, means for connecting said series capacitor in series in a conductor of said line, a main protective gap device, means for connecting said main gap device in a bypassing circuit around the series capacitor, a trigger circuit for initiating breakdown of the main gap device, said trigger circuit comprising an auxiliary capacitor, a trigger gap device connected to be responsive to the voltage of said auxiliary capacitor, a high-frequency coil connected to the auxiliary capacitor through said trigger gap device, said high-frequency coil being also connected in a series circuit with the main gap device, a saturable reactor connected in series with the auxiliary capacitor, means for connecting the auxiliary capacitor and reactor across the series capacitor, the auxiliary capacitor and reactor being normally non-resonant at line frequency, whereby the voltage across the auxiliary capacitor normally has a fixed relation to the voltage across the series capacitor, and said reactor being adapted to saturate when the series capacitor voltage exceeds a predetermined value, whereby the reactor and auxiliary capacitor more closely approach a condition of line-frequency resonance and the voltage across the auxiliary capacitor rises more rapidly than the voltage across the series capacitor.

10. A series capacitor equipment for an alternating-current line, said equipment including a series capacitor, means for connecting said series capacitor in series in a conductor of said line, a main protective gap device, means for connecting said main gap device in a bypassing circuit around the series capacitor, a trigger circuit for initiating breakdown of the main gap device, said trigger circuit comprising an auxiliary capacitor, a tripper gap device connected to be responsive to the voltage of said auxiliary capacitor, a high-frequency coil connected to the auxiliary capacitor through said trigger gap device, said high-frequency coil being also connected in a series circuit with the main gap device, and means for energizing the auxiliary capacitor from the voltage across the series capacitor, said energizing means including an iron-core reactor connected in series with the auxiliary capacitor, and means responsive to the voltage across the series capacitor for saturating the core of said reactor when the series capacitor voltage exceeds a predetermined value to cause the reactor to approach a condition of line-frequency resonance with the auxiliary capacitor.

11. A series capacitor equipment for an alternating-current line, said equipment including a series capacitor, means for connecting said series capacitor in series in a conductor of said line, a main protective gap device, means for connecting said main gap device in a bypassing circuit around the series capacitor, a trigger circuit for initiating breakdown of the man gap device, said trigger circuit comprising an auxiliary capacitor, a trigger gap device connected to be responsive to the voltage of said auxiliary capacitor, a high-frequency coil connected to the auxiliary capacitor through said trigger gap device, said high-frequency coil being also connected in a series circuit with the main gap device, an iron-core reactor connected in series with the auxiliary capacitor, means for connecting the auxiliary capacitor and reactor across the series capacitor, the auxiliary capacitor and reactor being normally non-resonant at line frequency, whereby the voltage across the auxiliary capacitor normally has a fixed relation to the voltage across the series capacitor, and means responsive to the voltage across the series capacitor for saturating the core of said reactor when the series capacitor voltage exceeds a predetermined value to cause the reactor to approach a condition of line-frequency resonance with the auxiliary capacitor.

RALPH E. MARBURY.